# United States Patent
Sadran

[15] 3,645,750
[45] Feb. 29, 1972

[54] ALUMINOUS CEMENT-TRICALCIUM SILICATE BINDERS

[72] Inventor: ; Gerard Henri Sadran, Paris, France
[73] Assignee: Ciments Lafarge S.A., Paris, France
[22] Filed: Dec. 16, 1968
[21] Appl. No.: 784,239

[30] Foreign Application Priority Data
Dec. 22, 1967  France................................133633

[52] U.S. Cl..............................106/104, 106/109, 106/117
[51] Int. Cl. .........................................................C04b 7/32
[58] Field of Search.....................................................106/104

[56] References Cited

UNITED STATES PATENTS

| | | | |
|---|---|---|---|
| 2,880,100 | 3/1959 | Ulfstedt | 106/104 |
| 3,147,129 | 9/1964 | Armstrong et al. | 106/104 |
| 3,215,549 | 11/1965 | Ericson | 106/104 |
| 3,262,798 | 7/1966 | Booth et al. | 106/104 |

FOREIGN PATENTS OR APPLICATIONS

| | | | |
|---|---|---|---|
| 187,596 | 3/1967 | U.S.S.R. | 106/104 |
| 120,759 | 12/1948 | U.S.S.R. | 106/104 |

OTHER PUBLICATIONS

Lee & Desch, " The Chemistry of Cement and Concrete," Edw. Arnold & Sons, pgs. 151, 152, 153 & 433 (1956).

*Primary Examiner*—Tobias E. Levow
*Assistant Examiner*—W. T. Scott
*Attorney*—Brumbaugh, Graves, Donohue & Raymond

[57] ABSTRACT

Aluminous cements are disclosed containing tricalcium silicate. The tricalcium silicate acts as a delayed-action water-binding agent, which removes water from cement mortars in excess of that required to hydrate aluminous cement to the stable crystalline form of tricalcium aluminate hexahydrate.

7 Claims, No Drawings

ALUMINOUS CEMENT-TRICALCIUM SILICATE BINDERS

The present invention relates to a novel cement as well as to mixtures derived therefrom. Hydraulic binders based on aluminous cement have known advantageous properties. These include short setting times, followed by normal hardening times; resistance to attach by the elements or other corrosive agents; the ability to hydrate at temperatures below about 0° C.; and excellent refractory properties.

Under certain conditions of use aluminous cements undergo a gradual decrease in their strength and increase in porosity. These two phenomena, which are interrelated, are known to happen only when initial hydration occurred at a temperature of about 20° C. or lower, and the concrete is subsequently held under relatively high humidity and temperature conditions. The decrease in strength and increase in porosity has been found to result from the conversion of the hydrated calcium aluminates initially in the hexagonal crystalline form of the formula $CAH_{10}$ to the stable cubic crystalline form having the formula $C_3AH_6$. This deterioration in characteristics of the aluminous cements can be avoided by effecting hydration at such a temperature that the hydrated products are caused to assume directly the stable cubic crystalline form.

It is customary to use water to calcium ratios as close as possible to the critical value, i.e., the ratio corresponding to the water just required for the calcium aluminate present to fix the whole of available water as $C_3AH_6$ and $AH_3$ in accordance with the equation $$3CA+12H \rightarrow C_3AH_6+2AH_3$$

In practice, however, additional amounts of water are required to obtain mortars which may be easily worked. Concretes produced under these conditions have strengths which remain stable, or which may even improve with time, but are substantially lower than the maximum strengths obtainable for these cements under optimum conditions of use and holding. It is the presence of free water, after hydration to form $C_3AH_6$, which accounts for the differences which may be noticed.

To remedy these drawbacks of aluminous cements to take the best advantage of their properties, it is desirable to fix the excess water present in the mortar. However, this must be done without interfering with the hydration process. Among techniques for achieving fixation of the water which may be considered are:

1. providing for the presence of a water absorbent constituent in the cement or concrete which will fix the excess water after hydration, and
2. increasing the lime content of the hydrated aluminate.

These proposals for fixing the excess water, however, are not without difficulty. For example, with respect to the first proposal, the water-absorbing constituent to be effective must be an effective dehydrating agent, but at the same time it must exhibit a delayed action in order not to adversely effect hydration of the aluminous cements.

In the second proposal advantage is taken of several reactions by means of which excess water may be fixed. For a given amount of water corresponding to 3 moles of anhydrous calcium aluminate of the formula CA, and a corresponding lime addition, the hydrates can enter into the following reactions:

$3CA+30H \rightarrow 3CAH_{10} \rightarrow C_3AH_6+2AH_3+18H$ (12 moles $H_2O$ combined)

$3CA+3C+30H \rightarrow 3C_2AH_8+6H \rightarrow 2C_3AH_6AH_3+15H$ (15 moles $H_2O$ combined)

$3CA+6C+30H \rightarrow 3C_3AH_6+12H \rightarrow 3C_3AH_612H$ (18 moles $H_2O$ combined)

In accordance with the present invention, it has been discovered that the foregoing problems may be overcome by providing for the presence in the aluminous cement binder of from about 1 to 60 percent tricalcium silicate. Such amounts are partially or completely to inhibit the formation of unstable crystalline forms of hydrated calcium aluminates. The tricalcium silicate useful in the present invention may be of natural or synthetic composition and may be obtained from either artificial cement clinkers or from natural materials containing all the usual constituents. The tricalcium silicate has been found to exert delayed action which is effective to bind excess water present in the aluminous cement mortar.

To prepare tricalcium silicates useful in the present invention, known clinkering methods or fusion methods may be employed. The material as provided by either method can be used as such or after grinding either as a constituent of the aluminous cement mortar or as an aggregate for concrete prepared therefrom. Suitable raw materials which may be clinkered to form tricalcium silicates for use in the present invention include marls, calcareous marls, siliceous limestones and other suitable materials of same type. Such materials are used in proportions sufficient to provide a final clinker having the following approximate composition:

| | |
|---|---|
| CaO | 60 to 77% by weight |
| $SiO_2$ | 20 to 26% by weight |
| $Fe_2O_3$ | 0.2 to 6.5% by weight |
| $Al_2O_3$ | 1 to 6% by weight |

The addition of the tricalcium silicate of the present invention to the basic aluminous cement provides novel cements which are neither Portland cement no aluminous cement within the strict technical definitions of those terms. The resulting cements, nevertheless, possess some basic qualities of both of these known types of cement. Practically, therefore, the present invention presents a novel class of hydraulic cement which is intermediate between the Portland cements and aluminous cements.

It might be assumed that the properties of binary mixtures of tricalcium silicate and aluminous cement are a part of the whole range of quicksetting cement mixtures produced by mixing conventional ingredients. Careful investigation, however, has shown that this is not the case. As a general rule, binary mixtures of these materials were found to have important differences from the quicksetting cements. These differences are as follows:

a. The addition of tricalcium silicate only slightly reduces the setting time of aluminous cements below their normal value; and (b) the strengths of the tricalcium silicate-aluminous cement mixtures is very high comparable to those obtained with reference aluminous cements. This is in contrast to quicksetting cements which have relatively low strengths.

As already pointed out, cementitious mixtures prepared in accordance with the present invention will generally contain between about 1 and 60 percent by weight of the tricalcium silicate. The chemical composition and specific fineness of the tricalcium silicate also have some influence on the final properties of the mixture. In general, for blending with aluminous cement, the fineness of the tricalcium silicate preferably should be of 50 percent under $30\mu$ (flourometric value). When the fineness is too high, the resulting cements are too quicksetting for normal use. Materials of a fineness of sand, having a particle size of 0 to 0.6 millimeters, can also be used as will be explained below.

Test results are obtained with cements in which the tricalcium silicate generally is of the following preferred composition:

| | |
|---|---|
| CaO | 67 to 77% by weight |
| $SiO_2$ | 23 to 26% by weight |
| $Fe_2O_3$ | traces to 6.5% by weight |
| $Al_2O_3$ | traces to 3.5% by weight |

In using the novel cements of the present invention, water and aggregate are used in the usual proportions. A water/cement ratio in the order of 0.33 to 0.40 usually gives useful cements. The aggregate/cement ratio may range from 400 to 500, depending on the requirements of the particular application.

The present invention may be further illustrated by the following example:

EXAMPLE 1

A tricalcium silicate was prepared according to above proportions and known processing, that is to say by sintering between 1,260° and 1,500° C.

The resulting tricalcium silicate had the following composition:

| | |
|---|---|
| CaO | 70% by weight |
| $SiO_2$ | 26% by weight |
| $Fe_2O_3$ | 1.5% by weight |
| $Al_2O_3$ | 2.5% by weight |

The tricalcium silicate prepared as described in Example 1 was combined with "ciment fondu Lafarge" of normal grade, an aluminous cement of the following composition:

| | |
|---|---|
| CaO | 38% by weight |
| $Al_2O_3$ | 40% by weight |
| $SiO_2$ | 4% by weight |
| $Fe_2O_3$ | 11% by weight |
| FeO | 5% by weight |
| $TiO_2$ | 2% by weight |

Cement pastes and concretes prepared from the foregoing materials in various proportions were subjected to a wide variety of tests. The more significant results are summarized:

a. Types of Hydrates Formed

Tests were performed on the resulting mixture to determine the degree of fixation of water. The stable cubic tricalcium aluminate hydrate, $C_3AH_6$, which is normally obtained only after a temperature rise, was formed spontaneously at 20° C. during normal hydration of binders of the present invention having a tricalcium silicate content of about 50 percent by weight.

Hydration of the aluminous cement portion of the mixture in accordance with the present invention gave rise to calcium aluminate hydrates having a higher CaO content than conventional aluminous cements. The type of hydrate formed was a function of the amount of tricalcium silicate added. Despite the tricalcium silicate content, however, no trace of free calcium hydroxide could be found after hydration by X-ray inspection, irrespective of the amount of tricalcium silicate added. This shows, therefore, that the whole of the lime released by the hydration of tricalcium silicate was taken up in the formation of hydrates of calcium aluminate having a high calcium oxide content.

It should be noted in this respect that the absence of free lime released during hydration characteristic of cements prepared in accordance with the present invention minimizes disintegration due to weathering of cement structures, this being a known risk where Portland cements are used.

The absence of free lime after hydration has important favorable consequences in various fields of application, notably with respect to resistance to attack by water, i.e., the so-called "nondecomposable cements."

b. Setting Time

Measurements were also made to determine the time delay between the preparation of the mortar and the initiation of setting. For pure paste, i.e., paste containing the amount of water just theoretically necessary to convert the aluminous cement to the stable cubic $C_3AH_6$, W/C ratio of 0.23, the setting time is reduced from 3 hours to 1½ hours as the concentration of tricalcium silicate increased up to 40 percent by weight. Under normal conditions of use, however, where the water to cement ratio is higher, for example, a W/C ratio of 0.40, the setting time is reduced only from 110 minutes to 80 minutes as the amount of tricalcium silicate was increased to the same amount. For both mixtures studied, as well as for conventional aluminous cements, setting is completed about 1 hour after it is initiated.

c. Consistency

Measurements were also made on the consistency and workability of mortars prepared in accordance with the present invention. Consistency, as measured just upon mixing, or after a 30-minute period of holding, is not affected by the presence of added tricalcium silicate. Indeed, tricalcium silicate-containing cement mortars are generally endowed with superior workability relative to conventional aluminous cement mortars. Mortars or concretes produced in accordance with the present invention generally have a more plastic consistency.

d. Strength development under standard test conditions

Still further tests were conducted to measure the modification in the strength development curve of aluminous cements brought about by the incorporation of tricalcium silicate. These tests were conducted by storing samples under standard conditions, i.e., under water at 20° C. These conditions are especially favorable to the development of the strength of the reference aluminous cements.

In general, it was found that aluminous cements containing tricalcium silicate attained their peak strength more gradually. Measurement of strength after a 6-hour period showed that the tricalcium silicate acted as an inert material. Hence, samples of cement prepared in accordance with the present invention showed a lower strength than the reference aluminous cements. This effect persisted until about 24 hours for cements containing in the order of 25 percent tricalcium silicate, and up to 7 days for cements containing higher concentrations of tricalcium silicate.

Beyond these periods of time, however, the development of strength in aluminous cements containing tricalcium silicate was substantially more rapid. Within 28 days, mixtures containing 25 percent of tricalcium silicate acquired strengths of 90 to 100 percent of the reference conventional aluminous cements. Mixtures containing 40 percent of the tricalcium silicate attained strengths of 75 to 80 percent of conventional aluminous cements at the end of 28 days, and at this time the strength of the cement in accordance with the present invention still was continuing to increase.

e. Strength development under normal use conditions

It is known that in general the performance of aluminous cements under conditions of actual use is not as good as performance measured under laboratory conditions. The rise in temperature caused by hydration of the cement during curing is responsible for this loss in physical properties. Because the aluminous cements release large amounts of heat, the strength development tends to suffer.

In view of this phenomenon, further strength tests were made simulating as closely as possible conditions comparable to those present in practical applications. This test was performed in two steps:

1. During the initial 24-hour period of curing, the cement sample was subjected to a temperature time cycle corresponding to the temperature time curve of a mass of concrete insulated from its surroundings.

2. Beyond the initial 24-hour curing period, samples were stored as follows:

Held in air at 20° C. and 100 percent relative humidity.
Held in air at 20° C. and 50 percent relative humidity.
Held under water at 38° C.
Held in an insulated container.

In each case it was found that the presence of tricalcium silicate resulted in a marked improvement in strength properties which was practically proportional to the percentage of tricalcium silicate in the cement.

The relative strength of cement samples cured in accordance with the above-described temperature time cycle during the first 24 hours followed by continued curing under normal conditions, compared to the strength of cement samples stored under water at 20° C. from the time of mixing are set forth in Tables I and II.

TABLE I

| | 1 day | 7 days | 28 days | 90 days |
|---|---|---|---|---|
| Pure aluminous cement[1] | 50% | 55% | 60% | 54% |

| | | | | |
|---|---|---|---|---|
| Cement with 25% C₃S | 100% | 90% | 85% | 90% |
| Cement with 40% C₃S | 130% | 110% | 105% | 100% |

¹ The cement used as a standard of comparison in this and other examples was a cement of the composition given on page 7.

TABLE II $$100 \times \frac{\text{Strength after temperature-time cycle and storage under various normal conditions as described}}{\text{Strength after hydration at 20° and storage at 20° C.}}$$

A: Held in air at 20° C. and 100% relative humidity

| | 1 day | 7 days | 28 days | 90 days | 6 months |
|---|---|---|---|---|---|
| Reference aluminous cement ¹ | 53 | 54 | 58 | 59 | 53 |
| Cement with 25% C₃S | 100 | 87 | 85 | 86 | 86 |
| Cement with 40% C₃S | 130 | 110 | 104 | 108 | 95 |

B: Held in air at 20° C. and 50% relative humidity

| | | | | | |
|---|---|---|---|---|---|
| Reference aluminous cement | 60 | 66 | 70 | 63 | 60 |
| Cement with 25% C₃S | 100 | 100 | 87 | 90 | 80 |
| Cement with 40% C₃S | 140 | 120 | 104 | 99 | 97 |

C: Held in an insulated container

| | | | | | |
|---|---|---|---|---|---|
| Reference aluminous cement | 62 | 60 | 73 | | |
| Cement with 25% C₃S | 100 | 90 | 85 | | |
| Cement with 40% C₃S | 138 | 114 | 103 | | |

D: Held under water at 38° C.

| | | | | | |
|---|---|---|---|---|---|
| Reference aluminous cement | 59 | 55 | 68 | | |
| Cement with 25% C₃S | 104 | 87 | 81 | | |
| Cement with 40% C₃S | 154 | 111 | 100 | | |

¹ The reference aluminous cement used as a standard of comparison in this and other examples was a cement of the composition given on page 7.

The foregoing data demonstrate that the loss in properties of aluminous cements attributable to temperature rise during curing is substantially suppressed by providing for the presence of 25 percent tricalcium silicate. The use of a smaller amount of tricalcium silicate gives similar results but to a lesser extent, reflecting the lower amount of tricalcium silicate. For higher tricalcium silicate concentration, the properties are even improved by temperature rise during curing. These latter materials are in that respect analogous to Portland cements but still retain the advantage of aluminous cements characterized by the absence of lime release and by the presence of high strength after 6 hours.

f. Reduction in shrinkage

Still another important advantage of mixtures of tricalcium silicate and aluminous cements prepared in accordance with the present invention is a significant reduction in shrinkage during curing. Measurements of the shrinkage of samples of pure aluminous cement, and aluminous cements containing 25 to 40 percent by weight of tricalcium silicate, compared to the shrinkage of reference aluminous cement gave the following results:

TABLE III

| | Shrinkage (in μ/meter) | | | | | |
|---|---|---|---|---|---|---|
| | 1 day | 3 days | 7 days | 14 days | 28 days | 2 mos. |
| Pure aluminous cement | −200 | −490 | −600 | −660 | −670 | −670 |
| Cement with 25% product | −180 | −300 | −400 | −440 | −480 | −470 |
| Cement with 40% product | −140 | −200 | −300 | −370 | −410 | −370 | g. Alkaline hydrolysis

Still another advantage of the present invention is that aluminous cement-tricalcium silicate mixtures exhibit a markedly lower sensitivity to alkaline hydrolysis. It is known that aluminous cements can be decomposed by soluble alkaline compounds, a process commonly known as alkaline hydrolysis. The occurrence of alkaline hydrolysis is usually reduced through careful selection of aggregate, control of the fines in the cementitious materials, and provision for water circulation to the curing mass of mortar.

Tests made according to the usual testing methods show that aluminous cements containing 25 to 40 percent tricalcium silicate are significantly less prone to alkaline hydrolysis. The larger the amount of tricalcium silicate, the more effectively is this phenomenon controlled.

h. Refractory properties

It is known that an important use of aluminous cements depends upon their refractory character. Tests of the refractory character of aluminous cement-tricalcium silicate mixtures in accordance with the present invention have shown that the refractory properties are not impaired despite a marked decrease in the content of alumina.

The softening temperature of a standard aluminous cement was measured and compared with softening temperatures of cements containing from 25 to 40 percent of tricalcium silicate. The following results were obtained.

Reference aluminous cement 1,280° C.
Aluminous cement + 25 percent C₃S 1,250° C.
Aluminous cement + 40 percent C₃S 1,240° C.

i. Use of tricalcium silicate as an aggregate

It has already been pointed out that the tricalcium silicate employed in the present invention may be used either as finely ground cementitious material in the admix with the powdered aluminous cement, or, in aggregate form, as a substitution for a portion of aggregates normally employed in aluminous concretes. When using tricalcium silicate in this fashion, the substitution should be effected so as to not alter the particle size distribution of the aggregate. Such substitutions resulted in a significant strength improvement under all of the tearing conditions tested.

Tests illustrating the use of tricalcium silicate in this manner were performed by preparing a series of aluminous concretes in which the aggregate employed was sand from the Seine. Four pairs of comparable samples were prepared. In each sample pair a portion of the sand aggregate was replaced by tricalcium silicate of like particle size distribution. The cement used was aluminous cement known as "ciment fondu Lafarge"

of normal grade. The samples had the following compositions (by weight):

TABLE IV

Composition of the microconcrete aggregates

| Grain size | | Aggregate weight | | | |
|---|---|---|---|---|---|
| Sand from the Seine, mm. | Tricalcium silicate, mm. | Reference microconcrete | | Tricalcium silicate microconcrete | |
| | | Designation | Weight, g. | Designation | Weight, g. |
| 3.15–8.0 | | | 610 | | 610 |
| 0.63–3.15 | 0.2–0.63 | T1 | 615 | P1 | 615 |
| 0.2–0.63 | | | 300 | | 300 |
| 3.15–8.0 | | | 610 | | 610 |
| 0.63–3.15 | 0.1–0.2 | T2 | 715 | P2 | 715 |
| 0.1–0.2 | | | 200 | | 200 |
| 3.15–8.0 | | | 610 | | 610 |
| 0.63–3.15 | 0–0.1 | T3 | 765 | P3 | 765 |
| 0–0.1 | | | 150 | | 150 |
| 3.15–8.0 | | | 610 | | 610 |
| 0.63–3.15 | 0–0.1 | T4 | 815 | P4 | 815 |
| 0–0.1 | | | 100 | | 100 |

In all of the concrete samples prepared, 1,525 grams of aggregate, 490 grams of aluminous cement and 196 grams of water were intimately mixed.

Strength measurements made of the cement samples under various curing conditions yield the following results:

TABLE V

| Storage conditions | Concrete designation | Compressive strength (bars) | | |
|---|---|---|---|---|
| | | 6 hours | 24 hours | 7 days |
| Humid air at 20° C | T1–T2–T3–T4 | 600 | 720 | 815 |
| | Average: | | | |
| | P1 | 610 | 785 | 880 |
| | P2 | 595 | 755 | 875 |
| | P3 | 610 | 780 | 880 |
| | P4 | 600 | 715 | 870 |
| 3 hours at 20° C., then 4 hours at 70° C., then humid air at 20° C. | T1–T2–T3–T4 | 400 | 425 | 470 |
| | Average: | | | |
| | P1 | 500 | 505 | 620 |
| | P2 | 470 | 505 | 610 |
| | P3 | 460 | 520 | 630 |
| | P4 | 460 | 490 | 570 |
| 6 hours in steam at 70° C., then under water at 70° C. | T1–T2–T3–T4 | 280 | 300 | 430 |
| | Average: | | | |
| | P1 | 340 | 405 | 540 |
| | P3 | 370 | 440 | 625 |

The foregoing table shows that, even under the most severe conditions, the replacement of the fines portion of the same aggregate by tricalcium silicate, other factors being equal, results in a strength increase of up to 40 percent.

j. Complex cements

The advantageous properties of mixtures of aluminous cement and tricalcium silicate in the present invention are also found when these two materials are combined with other cementitious ingredients to form more complex mixtures. Tests made in this connection were particularly directed to ternary mixtures consisting of aluminous cement, tricalcium silicate and a third constituent being a calcium borate or gypsum or slag.

Aluminous cements containing calcium borate are generally more stable than conventional aluminous cements. It has been found that the substitution of tricalcium silicate for some portion of the calcium borate provides a ternary cement having at least the same qualities of the aluminous cement/calcium borate mixture and at the same time provides significant economies. Typical ternary mixtures which have been found suitable in this respect contain from about 50–90 percent of aluminous cement, 10–40 percent of tricalcium silicate and 2–10 percent of calcium borate (percentages being percent by weight). These ternary mixtures have substantially improved initial strengths, together with substantially equal final strengths and much better stability as compared to binary mixtures containing from 85–95 percent aluminous cement and 4–45 percent of calcium borate. These results were found under various curing conditions including curing in humid air, or under water at 20° C. and at controlled temperature time curing cycles in air at 20° C. with either 100 percent of 50 percent relative humidity, or under water at 38° C.

Another class of valuable ternary mixtures is that consisting of aluminous cement, calcined to gypsum, and tricalcium silicate. The tricalcium silicate is ground to 50 percent flourometry. These ternary mixtures were found to have good early strength and stability characteristics and reduced shrinkage relative to binary mixtures of aluminous cements either with tricalcium silicate or with gypsum. Typical ternary mixtures of this class contain from 50–75 percent aluminous cements, 25–30 percent tricalcium silicate and 0–25 percent of gypsum (percentages being by weight).

Ternary cements have also been prepared by adding slag (Composition CaO 42 to 48 percent in weight; $SiO_2$ 27 to 32 percent in weight; $Al_2O_3$ 13 to 18 percent in weight) to binary mixtures containing from 40 to 60 percent by weight of aluminous cement and 60 to 40 percent by weight tricalcium silicate. The slag addition percentages ranged from 30–70 percent based on the weight of the final mixture. The results obtained showed that lime released by the tricalcium silicate had a catalytic effect on the slag despite the very strong affinity of the calcium aluminates for tricalcium silicates. The cements had properties comparable to those obtained with the corresponding binary mixtures. The initial strengths were substantially proportional to the amount of aluminous cement, while the strengths after 28 days of curing were in the same order as those of supercements.

In summary, it has been found that tricalcium silicate in accordance with the present invention is a valuable additive for aluminous cements and concretes, as well as for more complex mixtures of aluminous cements. Cements and concretes containing tricalcium silicate in accordance with the present invention have better working properties. Moreover, the tricalcium silicate exerts a delayed water-binding action which permits the use of water to cement ratios above those normally permitted in the use of aluminous cements.

I claim:

1. A hydraulic cement consisting essentially of aluminous cement and a material which consists of at least about 90 percent by weight tricalcium silicate, said tricalcium silicate material containing from about 67 to 77 percent by weight calcium oxide, from about 23 percent to about 26 percent by weight silicon dioxide, not more than about 6.5 percent by weight $Fe_2O_3$, and not more than about 3.5 percent by weight $Al_2O_3$, the tricalcium silicate material being present in an amount from about 1 to 60 percent by weight of the blended amounts of tricalcium silicate material and aluminous cement.

2. A cement in accordance with claim 1 wherein said tricalcium silicate comprises from about 25 percent to about 40 percent by weight of the blended amounts of aluminous cement and tricalcium silicate.

3. A cement in accordance with claim 1 wherein said tricalcium silicate has an average particle size corresponding to a flourometric value of 50 percent (30 $\mu$).

4. A cement composition in accordance with claim 1 wherein said tricalcium silicate has a particle size in the range of from 0 mm. to 0.6 mm.

5. A cement composition in accordance with claim 1 further combined with a calcium borate to form a ternary hydraulic cement, said ternary hydraulic cement having from 50 to 90 percent by weight aluminous cement, from 10 to 40 percent by weight tricalcium silicate and 2 to 10 percent by weight calcium borate.

6. A cement composition in accordance with claim 1 further combined with gypsum to form a ternary hydraulic cement, said ternary hydraulic cement having from 50 to 75 percent by weight aluminous cement, from 25 to 30 percent by weight tricalcium silicate and up to 25 percent by weight gypsum.

7. A cement composition in accordance with claim 1 further combined with slag to form a ternary cement, said ternary mixture being composed of from 30 to 70 percent by weight of a mixture of aluminous cement and tricalcium silicate in a weight ratio of between 40:60 and 60:40, and from about 70 percent to about 30 percent by weight slag.

* * * * *

UNITED STATES PATENT OFFICE
CERTIFICATE OF CORRECTION

PO-1050
(5/69)

Patent No. 3,645,750      Dated February 29, 1972

Inventor(s) Gerard Henri Sadran

It is certified that error appears in the above-identified patent and that said Letters Patent are hereby corrected as shown below:

Column 1, line 7, "attach" should read --attack--;

Column 1, line 64, "$2C_3AH_6AH_3+15H$" should read --$2C_3AH_6+AH_3+15H$--;

Column 1, line 66, "$3C_3AH_612H$" should read --$3C_3AH_6+12H$--;

Column 2, line 25, "no" should read --nor--;

Column 4, line 49, "temperature time" should read --temperature-time--;

Column 4, line 50, "temperature time" should read --temperature-time--;

Column 4, line 63, "temperature time" should read --temperature-time--;

Column 5, line 4, "The cement" should read --The pure cement--;

Column 5, line 5, Reference to "the composition given on page 7" should read --the composition given in column 3--

Column 5, line 2 of Table II, after "described", insert --under.--

Column 5, last line of Table II, change "on page 7" to --in column 3--;

Column 8, line 10, "temperature time" should read --temperature-time--.

Signed and sealed this 5th day of September 1972.

(SEAL)
Attest:

EDWARD M. FLETCHER, JR.
Attesting Officer

ROBERT GOTTSCHALK
Commissioner of Patents